Figure 1:
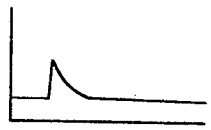

May 26, 1970     F. A. LOVING     3,514,748
METHOD AND DEVICE FOR ECHO RANGING
Filed Nov. 17, 1961     2 Sheets-Sheet 1

FIG. 8
FIG. 9
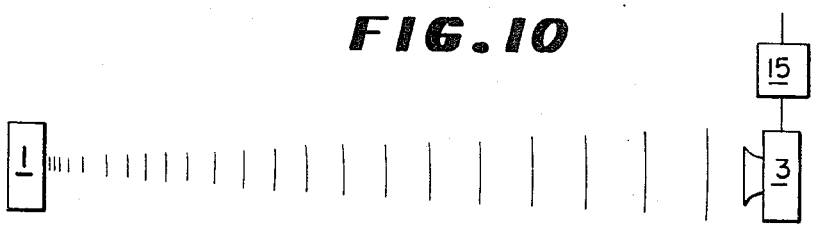

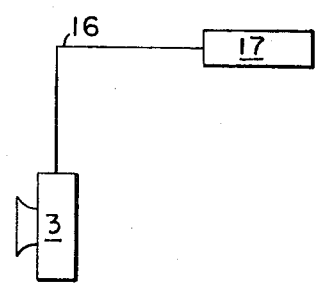
FIG. 11
INVENTOR
FRANK A. LOVING
BY John H. Tregoning
ATTORNEY

3,514,748
METHOD AND DEVICE FOR ECHO RANGING
Frank A. Loving, Wenonah, N.J., assignor to E. I. du Pont de Nemours and Company, Wilmington, Del., a corporation of Delaware
Continuation-in-part of application Ser. No. 781,166, Dec. 17, 1958. This application Nov. 17, 1961, Ser. No. 153,783
Int. Cl. G01s 9/68
U.S. Cl. 340—3                                 2 Claims The present invention relates to an improved method and device for echo ranging. More particularly, this invention relates to an explosives echo ranging means whereby the presence of an undersea object can be determined much more reliably and at greater distances than by any of the systems now in use. This application is a continuation-in-part of my co-pending application Ser. No. 781,166, filed Dec. 17, 1958, now abandoned.

Increased emphasis on the importance of submarines as a striking force in modern warfare requires that effective defenses be evolved to combat the undersea craft. An essential feature in any defense is the ability to detect quickly and reliably the presence of enemy submarines, preferably at great distances from vital areas.

A method of echo ranging now in use involves (a) detonating an explosive charge under water to produce a pressure pulse, i.e., a sonic pulse; and (b) recording the arrival at a receiver of said pulse, both as a direct pulse and as a reflected pulse, the time interval between the reception of the direct and reflected pulses being useful in determining the range of a reflecting object from the receiving device. The sonic pulse emanates in all directions from the explosive charge. A hydrophone, which may be electrically connected to a manned listening post, a shore installation, or stationary aircraft, or may be part of a floating radio transmitting unit known as a sonobuoy, acts as the receiver and detects first the pulse which has travelled in a direct path from the explosive charge to the hydrophone. If a subsequent pulse from the charge is received by the hydrophone, such subsequent pulse must have been reflected from some object, i.e., this pulse is an echo pulse. The sonic or pressure pulses are converted to electrical pulses by the hydrophone and as such are relayed, for example, through a connecting wire or by radio transmission, to a device presenting a visual record. From the recorded information (i.e., the time interval between the arrival of the direct and the reflected pulse and therefore the difference in distance travelled by the direct pulse and the reflected pulse) and from the known data, i.e., the direction and distance of the charge from the hydrophone, one can draw an ellipsoid which defines all possible locations of the reflecting object. By obtaining several sets of data, either from additional hydrophones located at scattered points or by the use of several charges at various locations, the exact location of the reflecting object can be determined.

The method described is subject to several deficiencies. The detonation of the explosive charge produces a transient pulse containing many frequencies. Because of the limitations of hydrophones, only certain frequencies register well. If the transient pulse is not rich in those frequencies, only a weak electrical signal is produced by the hydrophone. Inasmuch as much extraneous noise is constantly present in the ocean, the signal-to-noise ratio may be so low that an echo pulse is not readily identifiable in the record obtained. The transmission of sonic pulses through the ocean varies with frequencies, certain frequencies being transmitted much farther, without absorption, than others. In recent years, coatings have been developed which selectively absorb sonic pulses in relatively narrow frequency ranges. A submarine containing such coating would not strongly reflect pulses in these specific frequency ranges. Thus the method is severely limited to relatively short distances, i.e., a three to four mile radius, and requires expert reading of the record of relatively weak signals.

Accordingly, an object of the present invention is to provide a means for detecting underwater objects which is more reliable than the present means. A further object is to provide a means for detecting underwater objects which is effective over a longer range than are present means. Additional objects will become apparent as this invention is more fully described.

In accordance with the foregoing objectives, a method of echo ranging is provided which comprises positioning underwater a linear array of at least two detonating explosive charges, the axis formed by said linear array being essentially vertical in the water, and at least one hydrophone separated from said array in a generally normal direction with respect to the axis formed by said array, initiating the array sequentially so as to provide a time interval between the detonation of said charges which is the reciprocal of a preselected frequency, and recording the reception of sonic pulses having said preselected frequency.

The linear array of explosive charges employed in the method of this invention constitutes a sonic pulse source which produces a sequence of discrete pulses, the spacing between pulses being such as to provide a desired frequency. The pulsation produced is one whose Fourier frequency spectrum is enriched or reinforced in the region of the desired frequency. The present invention provides an assembly for producing a sequence of at least two discrete sonic pulses, said pulse sequence having a frequency rich in a preselected frequency, which comprises a linear array of at least two detonating explosive charges, said charges being spaced apart sufficiently that detonation of one will not cause detonation of another by influence, an explosive delay train sequentially connecting said charges, and means for initiating a terminal charge of said linear array, said delay train being such as to provide a time interval between the detonation of said charges which is the reciprocal of said preselected frequency and also as to provide an axial component of the detonation velocity of said linear array of less than 1500 meters per second. The pulses emanating in a direction substantially normal to the axis formed by the linear array of charges will then be spaced approximately one wave length, i.e., one period, apart in the desired frequency range, and this frequency thus will be reinforced over other frequencies in the spectrum. Accordingly, the charge array will be positioned, with the aid of appropriately designed structural appendages, e.g., weights or tail fins, so that the axis of the charge array will be essentially vertical in the ocean, and the hydrophone, held for example by a buoy, will be in a generally normal position to this axis. Because in submarine detection work the vertical distance between an expected target and the sonic pulse source will be small in contrast to the horizontal distance, slight variations from a normal plane to the axis of the charge array in the position of either the hydrophone or the reflecting object will produce negligible variations in the timing between pulses of a sequence, i.e., in the frequency range.

In order to assure the reception of a sequence of discrete pulses by a hydrophone at a position normal to the axis of the charge array, the linear array of explosive charges must be one whose axial component of the detonation velocity, i.e., whose effective velocity of detonation in the direction of travel of the detonation, is less than the speed of sound in the surrounding medium, i.e., less than 1500 meters per second for underwater operations. If the axial component of the detonation velocity equals the speed of sound in the medium, the pulses emitted from each charge will superimpose in an axial direction from the charge array to form a single pulse. As a result, a linear charge array having an axial component of the detonation velocity exactly equal to the speed of sound in water will emit maximum energy (a single pulse) in the direction of travel of the detonation and considerably less energy in other directions. If the axial component of the detonation velocity exceeds the speed of sound in the medium, there will always exist certain directions from the charge array where the pulses will superimpose to form a single pulse.

The particular frequency which will be selected for emission and reception in the present method preferably is one which will propagate best in the ocean, i.e., suffer minimum attenuation with distance, one which lies in the relatively quiet part of the frequency spectrum of the normal noises of the sea, one which possesses the maximum reflecting capacity, particularly from a small cross-section of a metal object is contrasted to nonmetal objects, or one which is not absorbed by a coating on a submarine. In actual practice, it may be preferred to select a frequency which, while not optimum for any single feature, represents a compromise which gives the best overall performance.

The sonic pulse source of the present invention is used in conjunction with at least one sonic pulse receiving device, i.e., a hydrophone such as in a sonobuoy, and a device which makes a visual record of the electrical pulses transmitted by the receiving device corresponding to the pressure or sonic pulses received thereby. Such visual record may be transitory, as for example on the face of an oscilloscope, or may be permanent, as for example inked on paper or photographically reproduced on sheets of sensitized paper. Such receiving units and recording units are conventional in the art. The recording apparatus will register the arrival of only those pulse sequences having a frequency which is reinforced by the sonic pulse source, i.e., the preselected frequency. This is accomplished by providing a device in the receiving or recording unit or therebetween which will reject pulse sequences which are outside of the reinforced frequency spectrum of the pulsation produced by the sonic pulse source. Such a device can be any conventional device known to the art, e.g., a band-pass filter.

Figure 2:
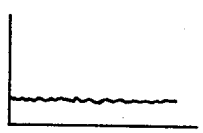
Figure 3:
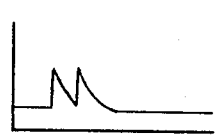
Figure 4:
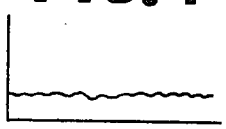
Figure 5:
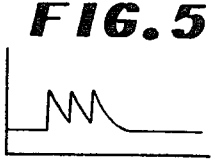
Figure 6:
Figure 7:
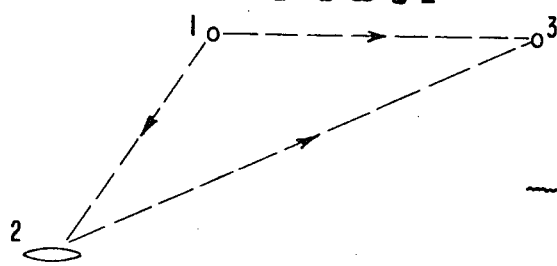
Figure 10:
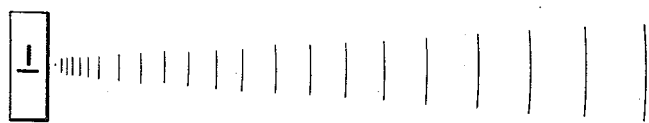
Figure 12:
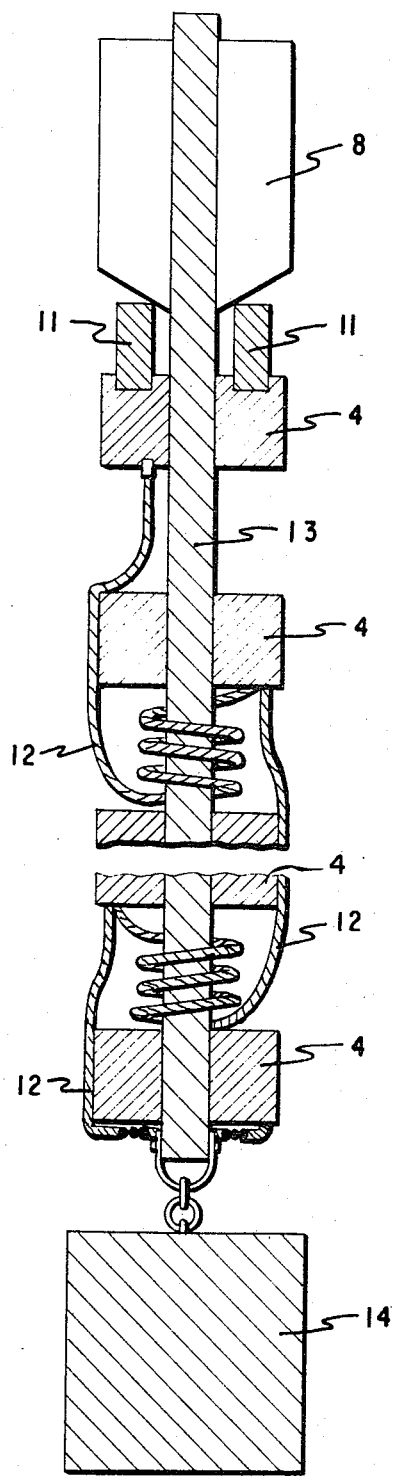

In order to more fully describe the present invention, reference is now made to the accompanying drawings in which FIG. 1 illustrates a typical pressure pulse generated by a conventional, single-charge source as it appears in the vicinity of the source; FIG. 2 illustrates the type of record produced by such pulse after it has travelled a considerable distance from the source; FIGS. 3 and 4 represent similar pulse records from a two-charge source in which the charges are axially aligned and initiated sequentially; FIGS. 5 and 6 represent similar pulse records from a three-charge source in which the axially aligned charges are fired sequentially; FIG. 7 represents a plan view of a typical underwater detection operation; FIG. 8 represents a pulse record produced by such operation using the method of the present invention; FIG. 9 represents a two-charge source in an assembly designed to be dropped from an aircraft in the method of this invention; FIGS. 10 and 11 are diagrams showing the relative placing of an explosive sonic source and receiving means as used in the present invention; and FIG. 12 represents a multi-charge source in an assembly designed to be dropped from a surface vessel.

Referring now to the drawings in greater detail, in FIGS. 1, 3, and 5 are shown the sharp pressure spikes produced in the vicinity of the detonation of a 1-charge, 2-charge, and 3-charge source, respectively. Such spikes have components over a wide frequency range. Each pulse moves outward from the source in the form of an expanding sphere, and as the distance from the source, i.e., the radius of the sphere, increases, the pulse is rapidly attenuated. Many of the frequency components are so weakened by the surrounding medium that they essentially disappear, particularly the very high-frequency components producing the spike-like record. Thus the pulse becomes represented by a sinusoidal transient wave in which a rarefaction, i.e., negative pressure, follows the positive pressure front. As shown in FIG. 2, a single pulse which has travelled a considerable distance is difficult to distinguish from the background noise. When a second pulse follows the first pulse at a time interval equivalent to the period of the frequency being recorded, an addition occurs which results in increased amplitude of the signal received in the selected frequency range. Thus the pulse record shown in FIG. 3 in time, i.e., distance, assumes the form shown in FIG. 4. Likewise, when a third pulse follows the second pulse at a time interval equivalent to the period of the selected frequency, there is additional amplification of the signal in the selected frequency range, as illustrated in FIGS. 5 and 6. In all of the foregoing figures, the vertical axis represents pressure and the horizontal axis represents time. In the case of the sequential pulses, i.e., in FIGS. 3 to 6 inclusive, the record illustrated is that of the pulsation received at a point normal to the axis of the sequentially detonated charges. As previously mentioned, the pressure or sonic pulse from the detonation of an explosive charge proceeds from the charge in the form of an expanding sphere. If sequentially initiated charges were fired from a common center, the pulses would emanate as concentric spheres, the time between the arrival of each pulse front then being equal in all directions. Inasmuch as the positioning of two or more charges at a common center would not permit sequential initiation of such charges, a spaced array must be used. Such spaced array eliminates the formation of concentric spheres of emanating pulses. However, in a plane normal to the axis of the charges, the pulses emanate concentrically. Thus, the frequency of the pulse sequence is constant for all degrees of arc in a plane normal to the axis of the charges. Thus, if the sonic pulse source is so positioned in the ocean that the axis of the linearly-aligned charges is essentially vertical, the time interval between successive pulses emanating horizontally will be essentially equal in all directions. Inasmuch as the operational depth for a submarine is limited to several hundred feet and the ranging operation normally involves a distance of miles, it is not necessary that the sonic pulse source, hydrophone, and target be at the same depth, i.e., it is not critical that the hydrophone and/or target be on a plane coincident to the sonic pulse source as well as normal to the axis of the charges in the source.

In FIG. 7 is illustrated, in plan view, a typical detection operation. In this figure, 1 represents a sonic pulse source, 2 represents a target, e.g., a submarine, and 3 represents a hydrophone. As indicated by the dotted lines, the pulsation from source 1 travels to hydrophone 3 in a direct path as well as an indirect path, the latter path being that taken by the pulsation from source 1 in the direction of target 2, which reflects the pulsation back to hydrophone 3. The time interval between the arrival of the direct pulsation and the reflected pulsation is a direct measure of the additional distance travelled by the reflected pulse, and based on a knowledge of the distance from the source 1 to the hydrophone 3, and the direction of the hydrophone from the source, an ellipsoid can be calculated, the surface of the ellipsoid representing every possible location of the target. By superimposing additional ellipsoids calculated from data obtained by operations with additional sonic pulse sources at different locations or by additional hydrophones at different locations, an exact point fix can be obtained. This procedure is conventional. Obviously, all plots are dependent upon the hydrophone's reception of a recognizable signal not only from the direct pulse but also from the reflected pulse.

In FIG. 8 is illustrated the type of trace obtainable on a chemical paper recorded from the impulses produced by means of a two-charge source wherein the charges are linearly arranged in a vertical position and detonated at a time interval so as to produce a pulsation whose Fourier frequency spectrum is enriched in the region of the desired frequency. A represents the trace produced by the pulse sequence which has travelled directly from the source to the receiver. The first pulse produces a pip which can be distinguished without too much difficulty from the background noise; the second pulse is unmistakable. B represents the trace produced by the reflected pulse sequence. Because of the greater distance travelled by the latter, and the attenuation of the pulses over such a distance, the first pulse is barely distinguishable over the background noise, and, by itself, would easily be lost. The second pulse, because of the enrichment in the frequency range being recorded, is clearly evident and provides an unmistakable record.

In FIG. 9 is illustrated a two-charge sonic pulse source in accordance with the present invention, said source being shown in an assembly designed to be dropped from an aircraft. 4 and 5 represent explosive charges positioned within a carrier or framework 6 having guide vanes 8 and an impact element 7, e.g., a weighted nose cone. The latter serves to reduce the effect of impact upon the assembly as it enters the water, and also to help maintain the assembly in an essentially vertical position. The vanes 8 will prevent tumbling as the assembly falls through the air and descends in the ocean. At the rear of carrier 6 is float 9 containing a transmitting or receiving unit (not shown) and a reel of a lowering cable (not shown), 10 represents an aerial. Adjacent to charge 4 is initiator 11, and between charge 4 and charge 5 is delay device 12. After the assembly enters the ocean, float 9 becomes detached and remains at the surface while the remainder of the assembly sinks in an essentially vertical position. When the assembly arrives at a predetermined depth, as, for example, the length of the cable from float 9, initiator 11 is actuated and detonates charge 4. The actuation of initiator 11 may be produced by a timing device, by the pressure of the water at the selected depth, or by the completion of the run of the lowering cable. One of the suitable actuation devices which can be used is the pressure-actuated detonator described in U.S. Pat. 2,726,602. The instant of initiation will be signalled by the transmitter in float 9 so that an accurate determination of the distance between the sonic source and the hydrophone can be established. The transmitter may be battery-powered, or the energy for transmission may be produced by the effect of the detonation of charge 4 on a material such as barium titanate crystals. Alternatively, float 9 may contain a receiving unit, and actuation of initiator 11 be responsive to the receipt of a signal transmitted from a remote point. If no uncertainty exists with respect to the location of the source, float 9 and its contents may be omitted. The means for initiating charge 4 and of providing knowledge of the time of initiation or location of the source are all conventional.

FIG. 10 shows, in diagram form, a sonic pulse source and an apparatus for receiving and transmitting the pulse signal emitted by the source. 1 represents a sonic pulse source, 3 represents a hydrophone, and 15 a radio transmitted. The hydrophone and transmitter combine to form a device known in the art as a sonobuoy. In this device the hydrophone receives the incoming sound, converting the mechanical impulses to electrical impulses, which are then relayed by the radio transmitter. The relayed signals are then fed to a recording device located, for example, on a ship or a shore installation.

FIG. 11 shows in diagram form an alternative means for receiving and transmitting the signal produced from source 1. The signal produced from source 1 is received by hydrophone 3, and the electrical signal from hydrophone 3 is fed via cable 16 to a recording device 17.

In FIG. 12 is shown a multicharge assembly in accordance with the present invention, the assembly in this figure having no carrier surrounding the charges and being suitable for lowering into the water from a surface vessel. The explosive charges 4 are in the form of cylinders pierced by an axial hole. A metal, e.g., steel or aluminum, mandrel 13 passes through the hole in each charge and maintains the charges in the desired equally spaced relationship from one another. The delay device 12 between charges is a low-energy connecting cord such as is described in U.S. Pat. 2,982,210. The cord extends from one charge to the next and is of such a length as to provide the desired time interval between detonation of the charges, the cord propagating detonation at a velocity of approximately 7000 meters per second. The length of cord between any two charges is equal to the length of cord between any other two charges. The cord is arranged in the manner shown in this figure to assure the continuous propagation of the detonation throughout the length of the cord, this arrangement permitting the detonation to proceed through only one section of the cord at any one time. The particular arrangement used to prevent detonation of more than one section of the cord at a time is not critical to the invention and can be any desired arrangement provided that a doubled-up or coiled section of the cord is not in the path of the detonation front from a previous charge. The first charge 4 of the array is initiated by initiators 11, which are actuated by the pressure of the water when the assembly reaches a certain preselected depth. Tail fins 8 and nose weight 14 are attached to the assembly to assist in attaining an essentially vertical fall of the assembly through the water. The means of attaching the weight to the assembly is conventional; for example, the weight may be attached in chain-linking fashion as shown in the figure, or by means of shrouds.

In my preferred sonic pulse source, the delay device 12 between charges will consist of a length of low-energy connecting cord comprising a core of a high-velocity detonating explosive within a metal sheath, the core containing from 0.1 to 2 grains of high explosive per foot of length. This cord is described in detail in U.S. Pat. 2,982,210. Using PETN for example as the high explosive, the cord will propagate detonation at a uniform velocity of approximately 7000 meters per second. Thus by selection of an appropriate length of such cord, a precise time interval between sequential pulses can be obtained. Because of the low brisance of the cord, detonation is not propagated between adjacent lengths of cord nor is a length of cord damaged by the detonation of an adjacent cord. To insure initiation of the cord and of the charge, an initiator may be fastened to each end of the cord.

Alternative delay devices, such as electric delay caps, may be used between charges provided the accuracy of delay is adequate to provide the necessary precise time interval between pulses to reinforce the desired frequency.

The individual explosive charges in the linear array may be made from any detonating explosive which will detonate reliably, when submerged, at a velocity in the range of 1700 to 10,000 meters per second. For ease in handling and assembling, the charges preferably will be made of a self-supporting explosive composition, for example cast TNT compositions or compositions of the type described in U.S. Pats. 2,992,087 and 2,999,743. Such compositions can be worked into various forms, for example into the cylindrical form shown in FIG. 12; furthermore, an axial perforation can be provided in the charges and they thus can easily be assembled as shown in FIG. 12. It will be understood, however, that any explosive which detonates under water in the aforementioned velocity range can be used provided that it can be assembled in the necessary manner. For example, explosives which are not self-supporting can be used by supporting them in waterproof containers.

The spacing between charges required to prevent the initiation of one charge by the shock wave or particles from a previous charge, i.e., detonation by influence, will depend upon the size of the charges and their sensitivity. For most military explosives, such as RDX, TNT, and the like, only a relatively small space, i.e., 6 to 10 inches, will suffice inasmuch as such explosives are relatively insensitive to detonation by influence. If the still more insensitive inorganic nitrate-nonexplosive fuel compositions are used, even less space is required.

The number of charges in the pulse-producing assembly will depend on various factors, such as the amount of frequency reinforcement desired, handling considerations, the manner in which the assembly is to be dropped into the ocean, etc. While a pulse source containing a large number of charges will provide a superior record over that obtained with a two-charge source, it may be preferred, for handling reasons, to use a two-charge source particularly in cases in which the assembly is to be dropped from an aircraft. When the assembly is lowered from a ship, longer assemblies can be handled, and in some cases it is desirable to use assemblies containing fifty or more charges.

At the present, the indications are that a frequency of about 3000 cycles per second is preferred for echo ranging in ocean waters. To obtain a lateral pulsation reinforced in this frequency range, a delay of 0.33 millisecond would be selected for the initiation of successive charges. Considering the size of the probable target, wave lengths of greater than 16 meters would not provide adequate resolution and reflection. Thus, a frequency of one hundred cycles per second represents a minimum usable frequency; to obtain pulse reinforcement at such frequency, a delay of 10 milliseconds between successive charges would be required. The highest usable frequency is in the range of about 50,000 cycles per second; the attainment of reinforcement in such a frequency range would require a delay of only 20 microseconds between charges. The described delay device, i.e., low-energy connecting cord, is adaptable to providing delay periods of either extreme without difficulty.

The manner of placing the pulse-producing assembly in the desired position in the ocean is not critical to the present invention. As indicated in the description, the assembly may be dropped by aircraft. Alternatively, the assembly may be dropped by a surface vessel or released by an undersea craft. The use of a propelling means in association with the assembly, such as a missile or torpedo motor, or even propelling the assembly from a cannon or mortar are also within the scope of this invention. Also, two or more assemblies may be used in combination for either simultaneous or sequential firing, and, if desired, assemblies providing pulses enriched in different frequency ranges may be used in a search operation.

The means used to package the sonic pulse source of this invention is not critical to the functioning of the source, and will depend on the nature of the explosive in the charges, the type of delay device used between charges, and the manner in which the assembly is to be introduced into the water. Obviously, if the charges and/or the delay device are adversely affected by the entry of water therein, a waterproof container will be provided therefor. Assemblies designed to be dropped from aircraft will preferably have guide vanes and nose cones, e.g., such as those shown in FIG. 9. Preferably, the forward end of the assembly will be weighted so as to assure an essentially vertical fall through the water.

The invention has been described in detail in the foregoing. Many modifications and alterations will be apparent to those skilled in the art and will not require departure from the spirit of this invention. Accordingly, I intend to be limited only by the following claims:

I claim:
1. An echo ranging device for locating an underwater object which comprises:
   (a) a linear array of at least two detonating explosive charges, said charges being spaced apart sufficiently that detonation of one will not cause detonation of another by influence;
   (b) means for initiating a terminal charge of said array; and
   (c) explosive delay means sequentially connecting said charges such that, upon initiation of said terminal charge by said initiating means, said explosive charges detonate sequentially at a time interval which is the reciprocal of a preselected frequency and which provides an axial component of the detonation velocity of said linear array of less than 1500 meters per second, the detonation of said charges providing a sequence of at least two discrete spherical pressure pulses whose frequency in a plane normal to the linear axis formed by said array is equal to said preselected frequency.

2. An echo ranging method for locating an underwater object which comprises:
   (a) positioning under water a linear array of at least two detonating explosive charges, the linear axis formed by said array being essentially vertical in the water, and at least one hydrophone separated from said array in a generally normal direction with respect to the axis formed by said array;
   (b) initiating said charges sequentially at a time interval which is the reciprocal of a preselected frequency and which provides an axial component of the detonation velocity of said linear array of less than 1500 meters per second, the detonation of said charges providing a sequence of at least two discrete spherical pressure pulses whose frequency in a plane normal to the linear axis formed by said array is equal to said preselected frequency;
   (c) receiving the pressure pulse sequences by means of said hydrophone; and
   (d) recording the reception of pulse sequences having said preselected frequency and the time between the arrival of said sequences.

References Cited

UNITED STATES PATENTS

| 2,133,484 | 10/1938 | Sherar. |
| 2,137,436 | 11/1938 | Barnhart _ _ _ _ _ _ _ _ _ _ _ 102—7.2 |
| 2,320,248 | 5/1943 | Shimek. |
| 2,587,301 | 2/1952 | Ewing. |
| 2,609,885 | 9/1952 | Silverman. |
| 2,770,312 | 11/1956 | Silverman. |
| 2,808,894 | 10/1957 | Eisler et al. |

RICHARD A. FARLEY, Primary Examiner

U.S. Cl. X.R.

181—0.5